INVENTOR
JOHN W. TURNER, JR.
BY C. L. Stallings
ATTORNEY

INVENTOR
JOHN W. TURNER, JR.
BY
ATTORNEY

March 3, 1970  J. W. TURNER, JR  3,498,586
STABILIZED PIPE SUPPORTING STRUCTURE FOR DRILLING RIGS
Filed Dec. 4, 1967  8 Sheets-Sheet 4
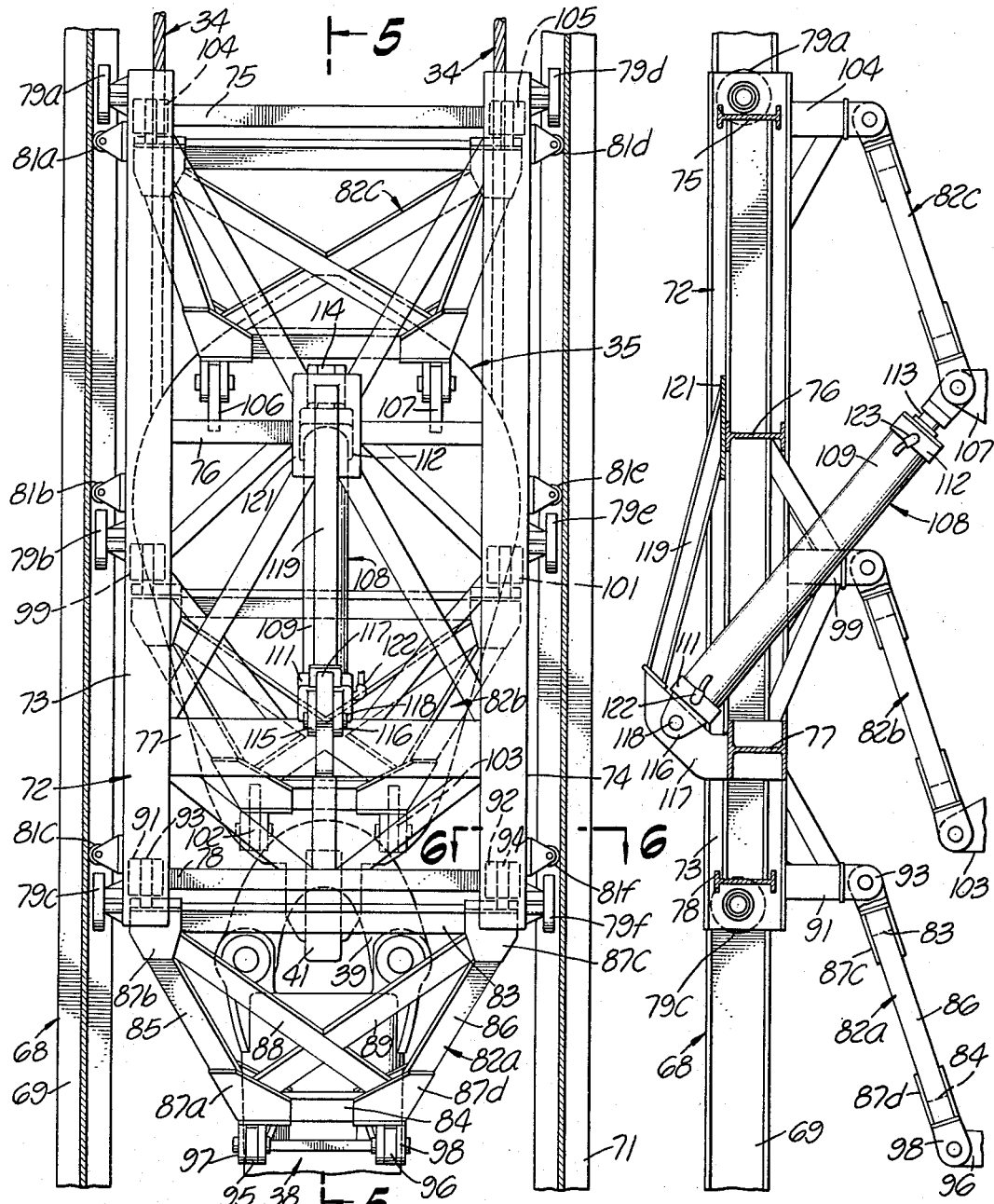
FIG. 4.
FIG. 5.
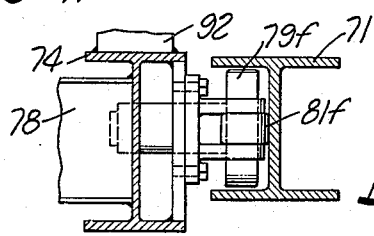
FIG. 6.
INVENTOR
JOHN W. TURNER, JR.
BY
ATTORNEY

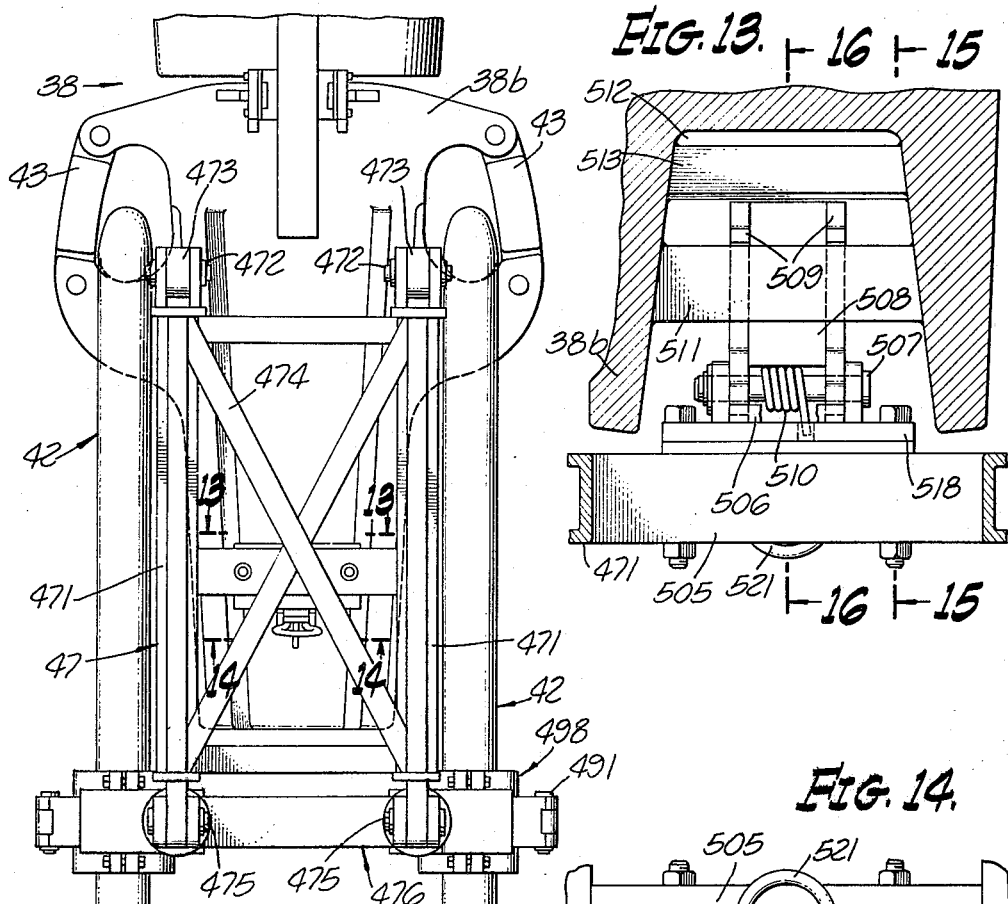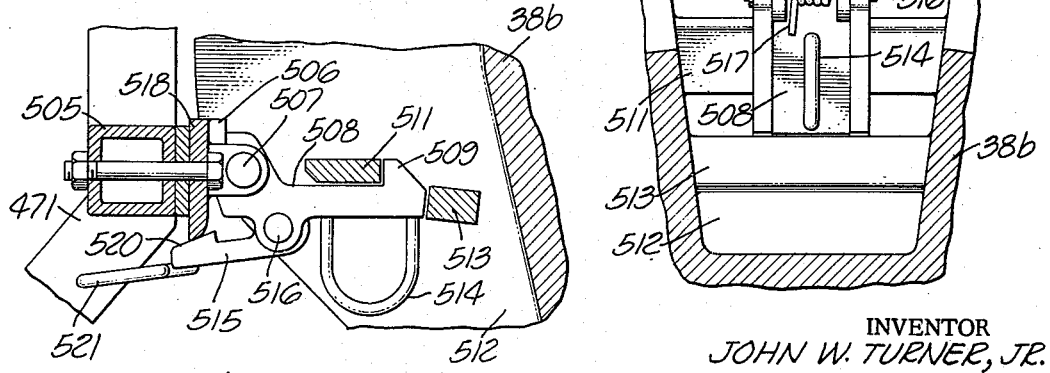

INVENTOR
JOHN W. TURNER, JR.
BY
ATTORNEY

March 3, 1970  J. W. TURNER, JR  3,498,586
STABILIZED PIPE SUPPORTING STRUCTURE FOR DRILLING RIGS
Filed Dec. 4, 1967  8 Sheets-Sheet 7

INVENTOR
JOHN W. TURNER, JR.
BY
ATTORNEY

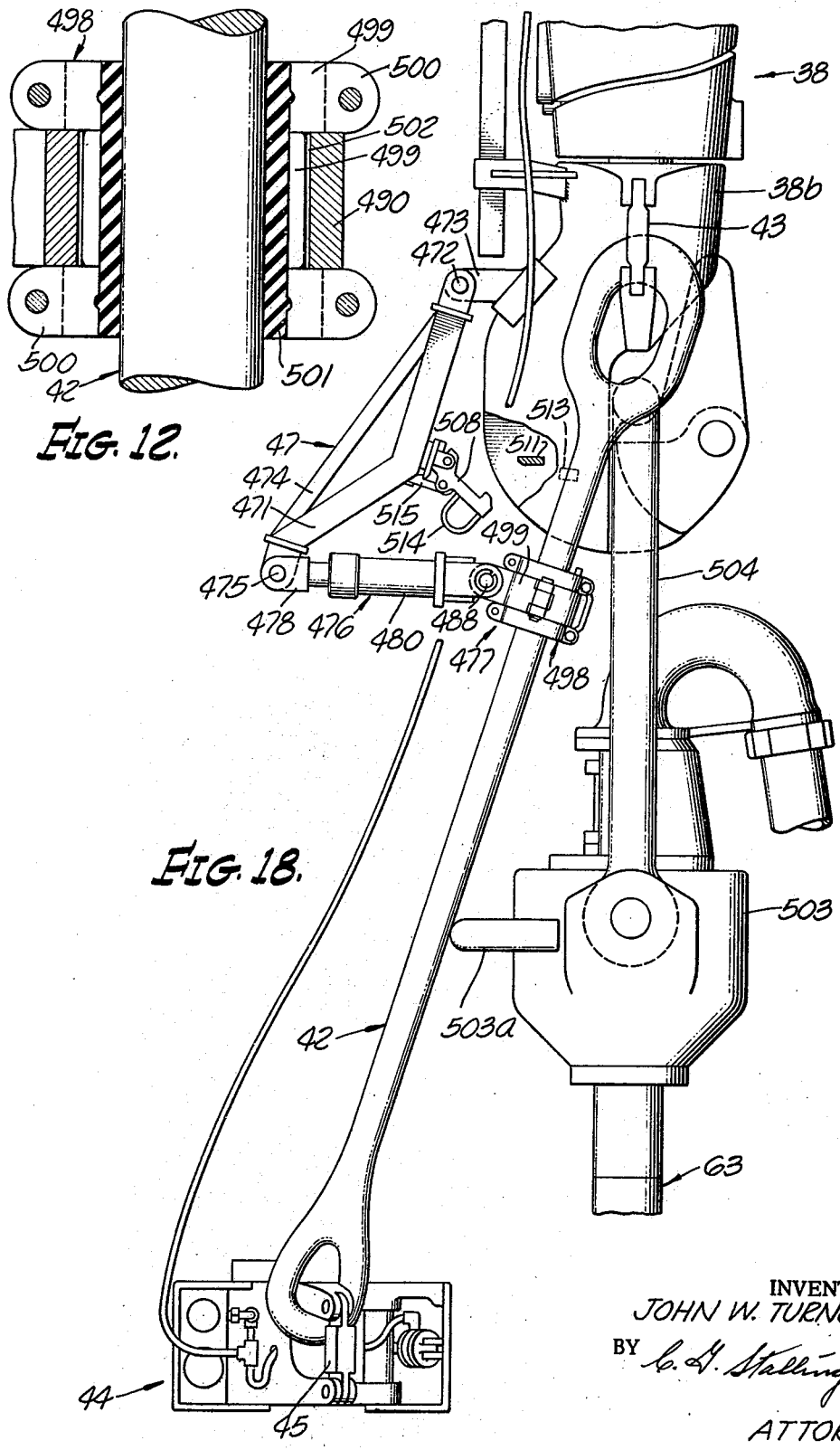

United States Patent Office 3,498,586
Patented Mar. 3, 1970

3,498,586
STABILIZED PIPE SUPPORTING STRUCTURE FOR DRILLING RIGS
John W. Turner, Jr., Houston, Tex., assignor to Byron Jackson Inc., Long Beach, Calif., a corporation of Delaware
Filed Dec. 4, 1967, Ser. No. 687,818
Int. Cl. B66c *23/60;* E21b *19/00;* B64d *17/38*
U.S. Cl. 254—139                                10 Claims

ABSTRACT OF THE DISCLOSURE

A stabilized pipe supporting structure for drilling rigs in which the drilling line supported traveling block is guided along a laterally offset track and is movable horizontally to the center of the derrick, the block being restrained against undesired movements, and the drilling hook supported by the block also being guided by said track and shiftable with said block to the center of the derrick while being restrained against undesired movements, and the elevator supporting links depending from the drilling hook being stabilized and restrained against swinging movements to assure engagement of a pipe joint by the elevator.

Background of the invention

In the drilling of oil and gas or other wells into the subsurface earth formation, rigs have heretofore been proposed and sometimes employed which are so equipped as to be operable through the entire drilling and well casing operations with a small crew who can control the operations from a remote location. Such operations include the handling of the drill pipe in a racker, as well as the manipulation of the drill string supporting equipment in such a manner that the usual drilling hook and supporting traveling block are held in an out of the way position to one side of the center of the derrick while being hoisted or lowered in the running or pulling of pipe, respectively.

Some drilling rigs are adapted for operation on a floating vessel when the well is being drilled under water, thereby subjecting the drill string hoisting equipment to variable forces tending to cause undesirable motion of the traveling block and hook, as well as undesirable motion of the usual elevator suspended from the hook by links. Efforts to effect engagement of the elevator with the pipe are thus hampered and an operator is required to attempt to synchronize the timed operations involved in engaging the pipe with the elevator.

In addition, any tendency of the elevator to be in motion is detrimental to automation of the operations, since automation of the operations would require that the block, hook, links, and elevator be in known positions at the point in time at which the elevator is to be engaged with the pipe, and unpredictable movement would result in failure of the elevator to be properly closed on the pipe, for example.

Particularly in the case of drilling rigs mounted upon floating vessels the pipe handling equipment is subjected to severe forces tending to shift the same out of operative position when the vessel is subjected to pitch and roll occasioned by rough seas, and, accordingly, it is desirable that the pipe handling equipment, including the traveling block, the hook, the elevator links and the elevator, be at all times restrained against undesired movements, particularly during periods of stormy seas, and it further being desirable that the pipe supporting equipment referred to above be movable in the case of certain modes of pipe handling from a laterally offset position to a centrally located position, facilitating engagement of the pipe by the elevator.

Summary of the invention

Accordingly, an object of the present invention is to provide in a well drilling rig of the type in which the traveling block is laterally retractable during raising and lowering of the hook and elevator during running and pulling of drill pipe, or during running of well casing, but the traveling block being shiftable to the center of the derrick above the well bore when the elevator is to be engaged with a length of pipe or when the hook is to be engaged with a drilling swivel; and traveling block guide stabilizing and positioning means, in combination with means for stabilizing the elevator links, so that when the traveling block is moved from the laterally retracted position to the pipe engaging central position it will be assured that the elevator is in a proper pipe engaging position, notwithstanding any tendency of the rig to partake of rapid changes in angular disposition as may be caused by the pitch and roll of a vessel on which the rig is mounted, on the one hand, or notwithstanding any other tendencies of the elevator links and elevator supported thereby to be affected by inertia forces upon movement of the traveling block to its centrally located position.

Another object of the invention is to provide in a drilling rig of the type referred to in the preceding object, means for not only stabilizing, guiding and positioning the traveling block and means for stabilizing the elevator supporting links, but also means for stabilizing the hook which is interposed between the traveling block and the elevator links so that the assemblage of traveling block, hook and links which heretofore constituted an articulated series of elements in a fully stabilized assemblage incapable of significant articulation at the connection between the traveling block and the hook, or at the connection between the hook and the links.

Further objects and advantages of the invention will be herein shown and described or will become apparent to those skilled in the art as defined in the appended claims.

In brief, applicant's invention resides in a derrick assembly having a traveling block suspended for vertical movement in the derrick, a hook suspended from the traveling block for vertical movement therewith, elevator links suspended from the hook for vertical movement therewith, a pipe engaging elevator suspended from the links for vertical movement therewith, and means for guiding the traveling block including a vertical track in the derrick, means carried by the traveling block and the track and vertically movable on the track during vertical movementss of the traveling block, the hook, the links and the elevator, for restraining the traveling block against other movements relative to the track, the improvement including means for restraining the hook from other movements relative to the track, and link stabilizer means for connecting the hook to the links to restrain the links from other movements relative to the hook as the traveling block, the hook, the links and the elevator move vertically relative to the track.

Brief description of the drawings

FIG. 4 is a still further enlarged view taken along the line 4—4 of FIG. 3 and looking in the direction of the arrows, parts being broken away to show interior construction;

FIG. 5 is a sectional view taken on the line 5—5 of FIG. 4 and lookng in the direction of the arrows;

FIG. 6 is an enlarged sectional view taken on the line 6—6 of FIG. 4 and looking in the direction of the arrows;

FIG. 7 is an enlarged fragmentary view in elevation of the link stabilizer means as embraced by the line 7—7 of FIG. 3;

FIG. 12 is a view in vertical section, as taken on the line 12—12 of FIG. 9;

FIG. 13 is an enlarged fragmentary detail view in horizontal section, as taken on the line 13—13 of FIG. 7, illustrating the releasable stabilizer latch;

FIG. 14 is an enlarged fragmentary detail view in horizontal section, as taken on the line 14—14 of FIG. 7, also illustrating the releasable stabilizer latch;

FIG. 15 is a fragmentary detail view in vertical section, as taken on the line 15—15 of FIG. 13;

FIG. 18 is a fragmentary view in side elevation illustrating the link stabilizer released and the links pivoted to an out of the way position by a drilling swivel.

Description of the preferred embodiment

Figure 1:
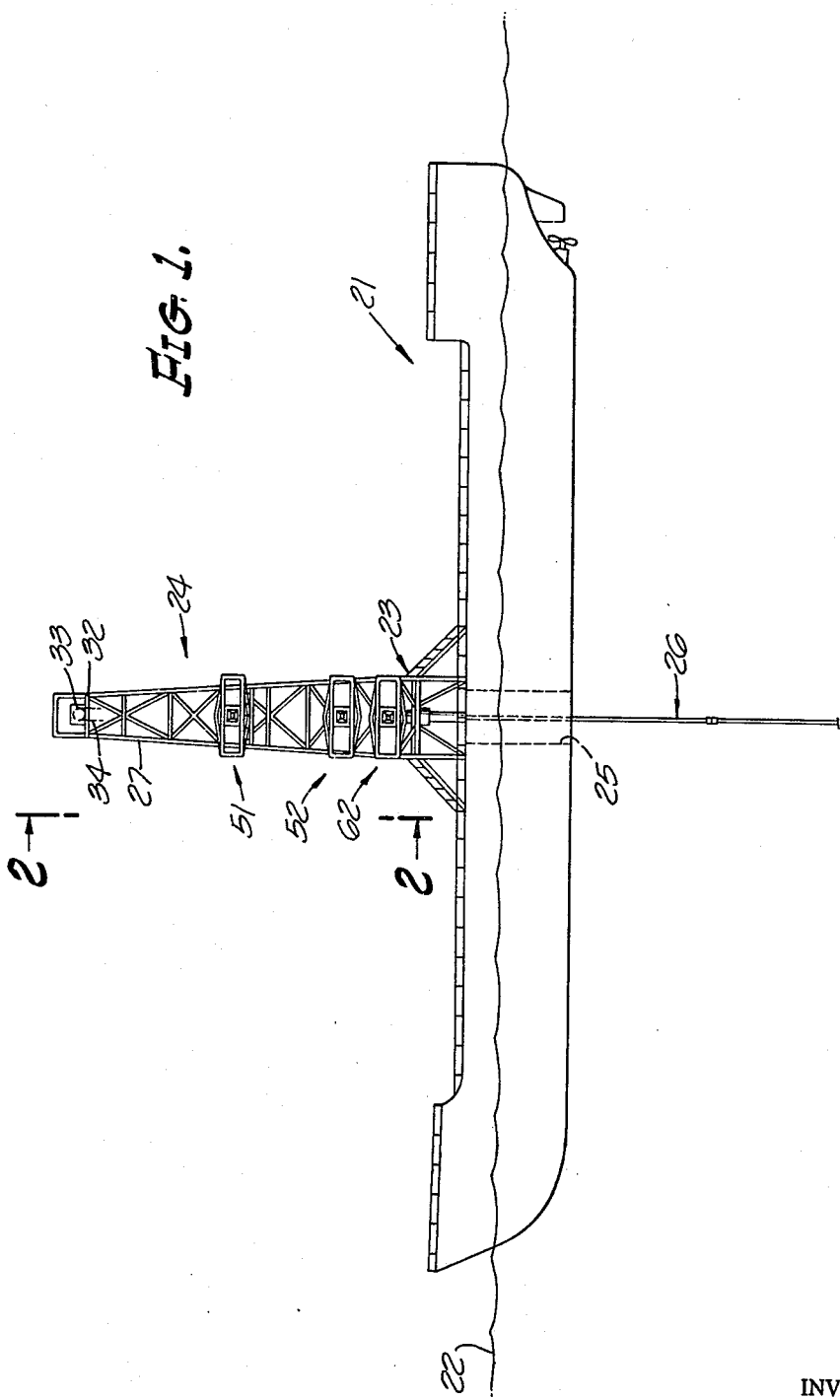
FIG. 1 is a side elevational view of a drilling ship having a derrick assembly including an exemplary form of apparatus in accordance with the invention.

Referring to FIG. 1, there is shown a vessel 21 afloat in the water, the surface of the water being designated 22. The ship has an elevated platform 23 positioned amidships. Erected on the platform is a drilling derrick 24. The ship has a moon hole 25 through which a string of drill pipe 26 extends from above the platform 23 into the water and thence into the earth (not shown) below. As this type of vessel with a platform and a derrick is widely known in the field to which the invention pertains, it need not be described here in further detail.

Figure 2:
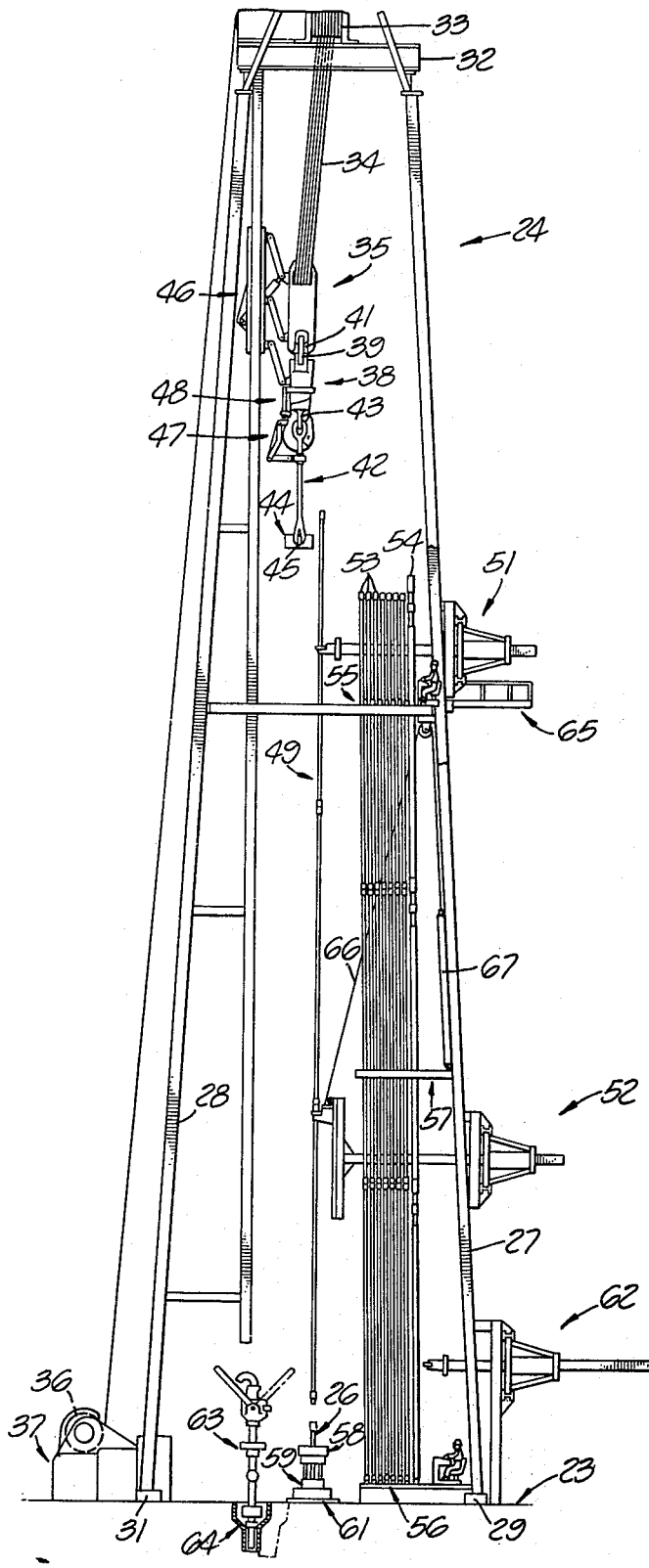
FIG. 2 is an enlarged view of the derrick assembly shown in FIG. 1 taken along the line 2—2 of FIG. 1 and looking in the direction of the arrows.

Turning now to FIG. 2, the derrick 24 is shown somewhat schematically, sway braces, guy wires and similar structural members being omitted to enable working apparatus to be shown more clearly. The derrick has generally vertical corner posts 27 and 28 supported on the platform 23 on base members 29 and 31. A water table 32 near the top of the derrick carries the usual crown block 33 which is aligned with the vertical center line of the derrick. Suspended from the crown block by cable 34 is a traveling block 35. As is usual, the dead end (not shown) of the cable 34 is anchored to the ship's structure or to the platform, and the other end is led to the drum 36 of a draw works 37 for raising and lowering the traveling block and the load supported thereby.

A hook structure 38 is swingably suspended from the bottom of the traveling block 35 by inter-engaged bails 39 on the hook and 41 on the block. Elevator links 42, only one of which is seen in FIG. 2, are swingably suspended from ears 43 on the hook structure, and the links have an elevator 44 swingably attached by ears 45 to the lower end of the links 42.

The general reference numeral 46 denotes the apparatus for positioning and guiding the block and hook structure in accordance with the invention. A device for stabilizing the links in accordance with the invention is designed by the general reference numeral 47. The general reference numeral 48 designates apparatus for supplying comprissed air to the elevator 44 to actuate it.

A stand 49 of drill pipe is shown as being supported by pipe handling equipment including rackers 51 and 52. Other stands 53 of drill pipe and a stand 54 of drill collars are shown at rest in a pipe rack having a finger board 55, a base 56, and an intermediate rack member 57. The upper end of the string of drill pipe 26 is shown projecting above the power tongs 58, the slips 59, and the rotary table 61. Casing manipulating apparatus is shown at 62. A swivel and kelly assembly 63 is disposed in the rat hole 64.

Projecting outwardly from the derrick and positioned under the racker 51 is a horizontal stage 65 upon which an operator may stand to adjust or repair the racker. Associated with the racker 52 is a cable 66 actuated by a fluid-powered piston-and-cylinder motor 67 for raising and lowering a component of the racker 52.

The present invention is more particularly concerned with the block and hook guiding and positioning means 46 and the link stabilizer means generally denoted at 47, such structure having broader application, as, for example, to any drilling rig in which automatic handling of pipe is to be accomplished, but being herein illustrated in an environment in which the effects of rolling of the vessel 21 on the one hand, or pitching of said vessel on the other hand, are prevented from causing undesired motion of the movable pipe supporting apparatus including block 35, hook structure 38, elevator links 42, and the elevator 44 supported thereby beneath the hook structure 38. The block and hook structure positioning means denoted at 46 in the present disclosure is more particularly the subject of the copending application of Jones and Turner filed concurrently herewith and entitled Block and Hook Structure Positioning and Guiding Apparatus, Ser. No. 687,819. The link stabilizer means 47 in the present disclosure is more particularly the subject of the copending application of Langowski and Turner filed concurrently herewith and entitled Link Stabilizer for Well Drilling Rigs, Ser. No. 687,817. The details of the finger boards 55 and 57, as well as the base 56, that is, the pipe racking apparatus and its mode of operation, are more particularly the subject of the application filed concurrently herewith in the names of Johnson and Turner and entitled Finger Board and Racker Apparatus, Ser. No. 687,820. The hook structure 38 and its relationship to the elevator 44, that is, the means of conducting elevator operating fluid pressure to the elevator from the hook so as to effect the remote operation of the elevator 44, are more particularly the subject matter of the application filed concurrently herewith in the name of Edward J. McFadden and entitled Fluid Conductor Means for Hook-Mounted Elevator, Ser. No. 687,829. Accordingly, the details of the rig assembly, except to the extent necessary to describe the structure and mode of operation of the combined traveling block and hook guiding and positioning means and link stabilizer means of the present invention, will not be further described herein.

Figure 3:
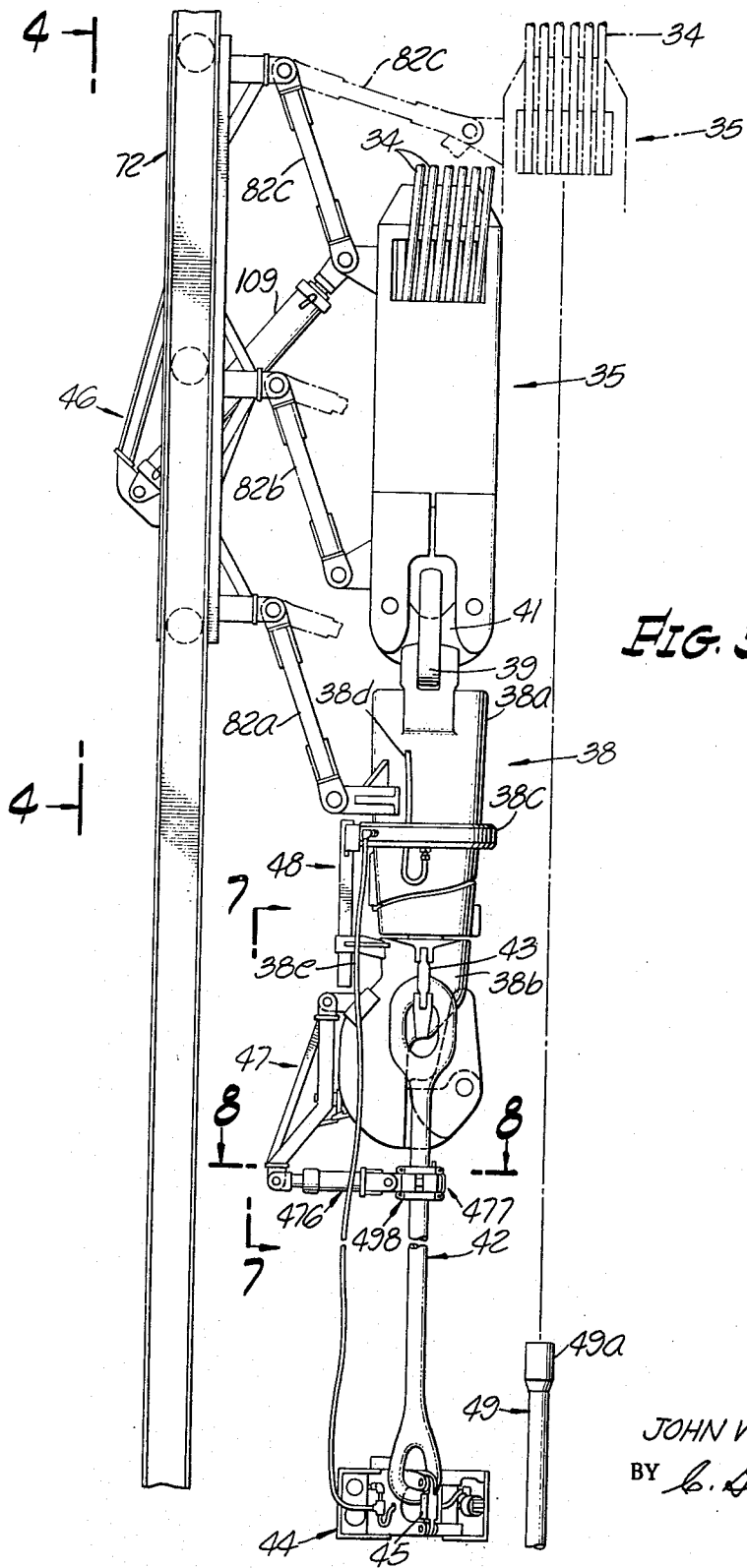
FIG. 3 is a further enlarged view of a portion of the derrick assembly shown in FIG. 2 and looking in the same direction.

Referring more particularly to FIGURE 3, it will be noted that the hook structure generally designated 38 comprises a hook body 38a and a hook 38b having the abovedescribed ears 43 thereon by which the links 42 are suspended. The hook body 38a is relatively stationary, that is, is non-rotatable, while the hook 38b is adapted to be rotated from a normal position, as shown in FIG. 3, to angularly displaced positions during certain of the pipe handling operations. Accordingly, the hook body 38a is provided with a manifold 38c for air under pressure supplied through a conduit 38d, air passing from the manifold 38c through a flexible conductor 38e to the elevator 44 so as to cause opening of the elevator 44 when desired. An exemplary air-operated elevator is shown in the patent to Chrisman and Nicolson granted Nov. 23, 1954, Patent No. 2,695,189, from which it will be noted that characteristically such an elevator will be air opened, but automatically closed, upon the forceful movement of a pipe into the open elevator in a lateral direction.

Referring to FIGS. 3–6, the apparatus 46 for positioning and guiding the block and hook structure has a track 68 supported by the derrick, as best seen in FIG. 2. The track 68 is parallel to the vertical center line of the derrick and laterally offset therefrom. The track has horizontally spaced, parallel, vertical I-beams 69 and 71 which provide rails on which a carriage 72 travels. The carriage has a frame with parallel, longitudinal side members 73 and 74 connected by transverse members 75, 76, 77 and 78. The frame carries wheels 79a, 79b, 79c, 79d, 79e and 79f that rotate on horizontal axes parallel to the transverse frame members and are received between the flanges of the I-beams 69 and 71 to support the carriage 72 for rolling movement along the track. The carriage also has smaller wheels 81a–81f rotatable on horizontal axes that extend at right-hand angles to the transverse frame members, which wheels roll upon the webs of the I-beams 69 and 71 to restrain sidewise movement of the carriage as it rolls along the track. The manner in which the wheels ride upon the I-beams is clearly shown in the sectional view of FIG. 6.

A parallel-arm articulated linkage system connects the carriage 72 to the traveling block 35 and the hook structure 38 to constrain the traveling block and hook structure to movement parallel to the carriage and in a vertical plane normal to the carriage, as indicated by the full-line and phantom views of the traveling block 35 as seen in FIG. 3. This linkage system has three identical rigid arms 82a, 82b and 82c, each being pivoted at one of its ends to the carriage and at the other of its ends to the hook structure 38 or the traveling block 35.

A description of one of the arms 82a will serve as a description of the other two arms 82b and 82c, as these arms are generally similar to each other with the principal difference being that the upper arm 82c is somewhat wider at its outer end than the other two arms. As best seen in FIG. 4, the arm 82a has a generally trapezoidal configuration; it has a transverse member 83 that is substantially the same width as the carriage 72, a shorter, parallel transverse member 84, and side members 85 and 86 extending between the ends of the transverse members. The corners of the arm 82a are joined together by gusset plates 87a–87d welded to the transverse and side members of the arm. The arm is strengthened by diagonal braces 88 and 89 welded to the corners of the arm.

A pair of hinge posts 91 and 92 are welded to the side members 73 and 74 of the carriage. The inner end of the arm 82a is pivoted to these posts on hinges 93 and 94 so that the arm may pivot on a horizontal axis with respect to the carriage. The outer end of the arm 82a is pivotally connected to brackets 95 and 96, welded to the hook structure 38. Such pivotal connection is afforded by hinges 97 and 98 which provide a horizontal hinge axis.

The arm 82b is similarly pivotally connected to hinge posts 99 and 101 on the carriage 72 and brackets 102 and 103 welded to the lower part of the traveling block 35.

The arm 82c is also similarly interconnected between the carriage 72 and the upper part of the traveling block 35. To this end, the arm 82c is hingedly connected to posts 104 and 105 on the carriage and to brackets 106 and 107 on the upper part of the traveling block 35.

It will be seen that the arms 82a, 82b and 82c are pivoted to the carriage 72 on axes that are horizontal or at right angles to the length of the track 68. These pivot axes lie in a plane that is parallel to the plane of the track 68 and the carriage 72, the respective pivot axes being vertically spaced from one another. The arms 82a, 82b and 82c are of equal length and lie in parallel planes included to the plane of the carriage 72. The outer ends of the arms 82a, 82b and 82c are pivoted to the hook structure 38 and to the traveling block 35 on horizontal axes that lie in a plane parallel to the plane of the carriage 72 and to the planes in which lie the pivot axes of the inner ends of the arms. Thus is provided a parallel arm linkage system that constrains the traveling block and hook structure to move toward and away from the carriage and parallel to the carriage.

Movement of the traveling block and hook structure with respect to the carriage is effected by a motor 108. As shown, the motor is a fluid-actuated piston-and-cylinder assembly. The motor has a cylinder 109 closed at its lower end by cylinder head 111. The upper end of the cylinder 109 has a cylinder head 112. A piston rod 113 extends through the cylinder head 112 and is slidable therein. The end of the piston rod within the cylinder 109 is fitted with a piston (not shown) that slides in the bore of the cylinder. The outer end of the piston rod 113 is pivoted to the bracket 114 on the same pivot axis as the outer end of the arm 82c, the bracket 114 being welded to the upper part of the traveling block.

The lower cylinder head 111 has a pair of ears 115 and 116 that embrace a cylinder mount 117 and that are pivotally connected to the mount by a horizontal pin 118. The cylinder mount 117 is welded to the transverse member 77 of the carriage at one end. The other end of the mount is supported by a strut 119 welded to that end of the cylinder mount and to a plate 121 welded to the transverse member 76.

Hydraulic fluid is admitted into and exhausted from the lower end of the cylinder 109 by a fluid connection 122. A similar fluid connection 123 serves to admit hydraulic fluid to the upper end of the cylinder 109 and to discharge hydraulic fluid therefrom.

It will now be apparent that the application of fluid pressure to the motor cylinder 109 will cause movement of the traveling block 35, together with the hook structure 38, laterally with respect to the derrick to a position overlying the well bore being drilled, that is, to the position generally represented by the phantom lines in FIG. 3, the parallel links 82a, 82b and 82c swinging outwardly and upwardly with respect to the carriage 72. It will also be apparent that such inward movement of the traveling block 35 and hook structure 38 will effect corresponding inward movement of the links 42 and the elevator 44, so that, when the elevator 44 is open, as shown in FIG. 3, it will be moved laterally into engagement with the upper end of the stand of pipe 49, herein illustrated as drill pipe having a tool joint 49a adapted to be engaged by the elevator 44, whereby the elevator will support the stand of drill pipe 49 shown in FIG. 2 so that the same may be lowered into engagement with the tool joint of the drill string 26 which extends upwardly through the power tong 58, whereupon the tong 58 may be slightly elevated to engage the tool joint at the lower end of the stand of pipe 49 to rotate the same relative to the drill string to make up an additional length of the drill string. Following this, the drilling line 34 will be lowered to lower the traveling block 35 and the suspended hook 38 and links 42 so as to lower the now lengthened drill string deeper into the well bore, during such downward movement the carriage 72 will ride downwardly along the track 68, and, when the pipe supporting structure has reached its lowermost position, the elevator will be released, the traveling block and hook retracted by the motor operated linkage and then raised to the elevated position, the carriage 72 riding upwardly along the track 68.

Referring now more particularly to FIGS. 3 and 7, the link stabilizer means 47 of the invention will be seen to include a frame composed of side members 471 pivoted at 472 to supporting brackets 473 carried by the hook 38b. The frame sides 471 are suitably reinforced with crossed braces 474, as best seen in FIG. 7. At their lower ends the frame sides 471 are pivotally connected at 475 to a shock absorber assembly generally denoted at 476, which in turn supports a shackle assembly generally denoted at 477.

Figure 8:
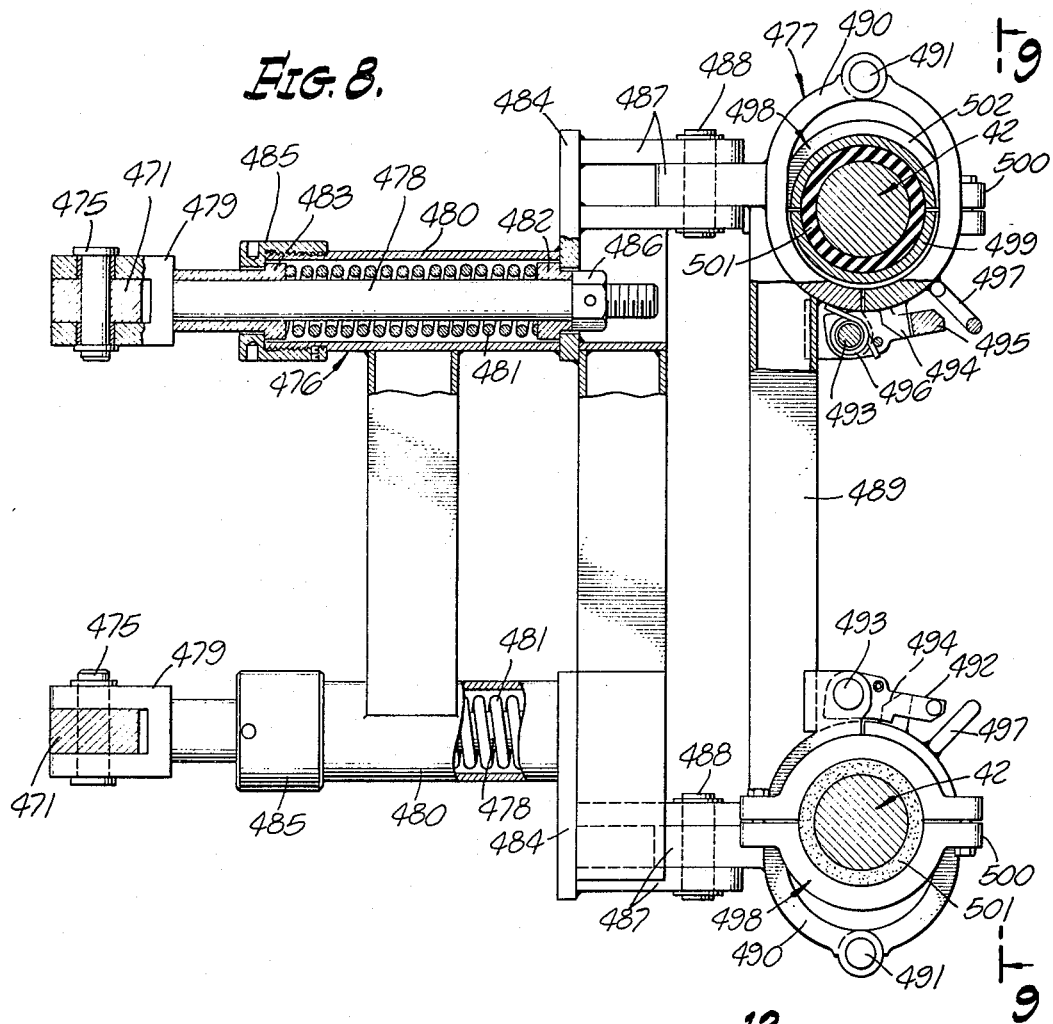
FIG. 8 is a view in horizontal section, as taken on the line 8—8 of FIG. 3.
Figure 9:
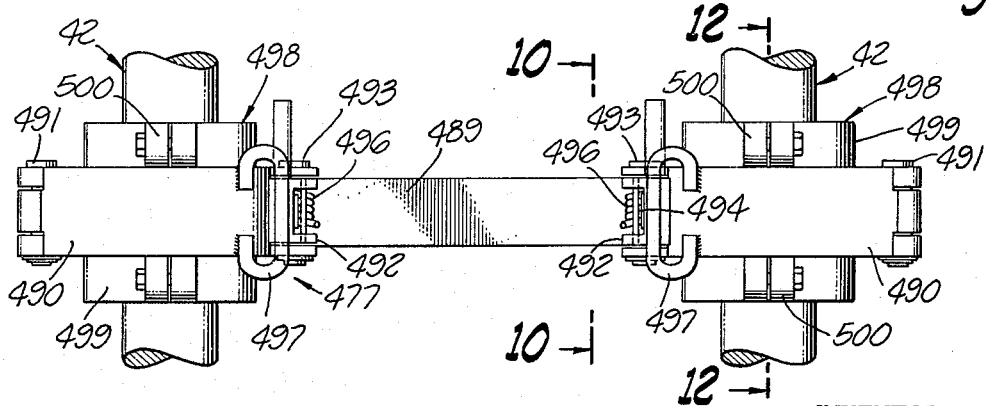
FIG. 9 is a view in side elevation showing the link shackle assembly embraced by the line 9—9 of FIG. 8.
Figure 16:
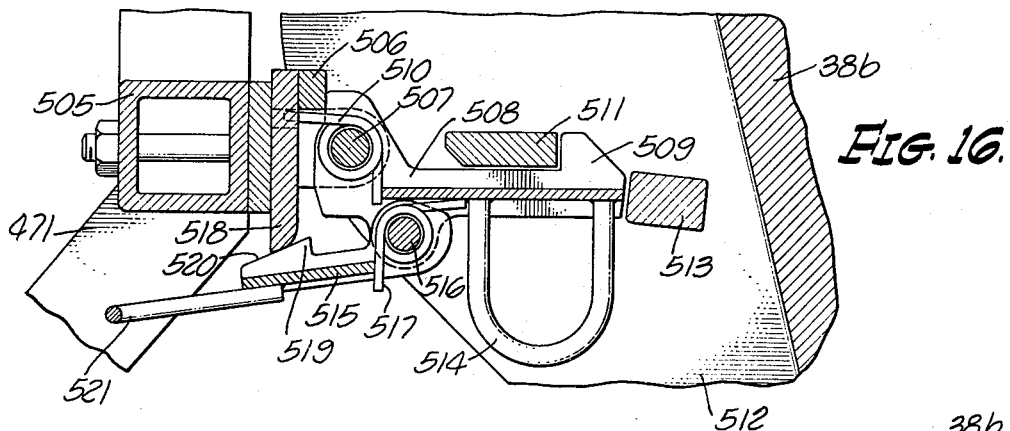
FIG. 16 is a fragmentary detail view in vertical section, as taken on the line 16—16 of FIG. 13, showing the releasable latch in engagement.

Referring to FIG. 8, the shock absorber assembly 476 includes a pair of horizontally extended and laterally spaced rods 478 having yokes 479 pivotally connected to the frame sides 471. Disposed about the respective rods 478 is a tubular spring housing 480 having a spring 481 therein, the spring seating at its opposite ends against spring seats 482 and 483 relative to which the rod 478 is slidable. Seat 482 abuts with a transversely extended plate 484, to which each of the tubular spring housings 480 is suitably attached, as by welding; while the spring seat 483 abuts with a retainer cap 485. Rods 478 are retained within the spring housings by means of nuts 486, so that each of the rods 478 is free to move axially in either direction, but such movement is resisted by the respective springs 481. Thus, the spring 481 constitute means normally resiliently biasing the shackle assembly 477 to a stabilized position, since the shackle assembly 477 is connected to the plate 484 by means of interengaged ears 487 and pins 488.

Figures 10, 11:
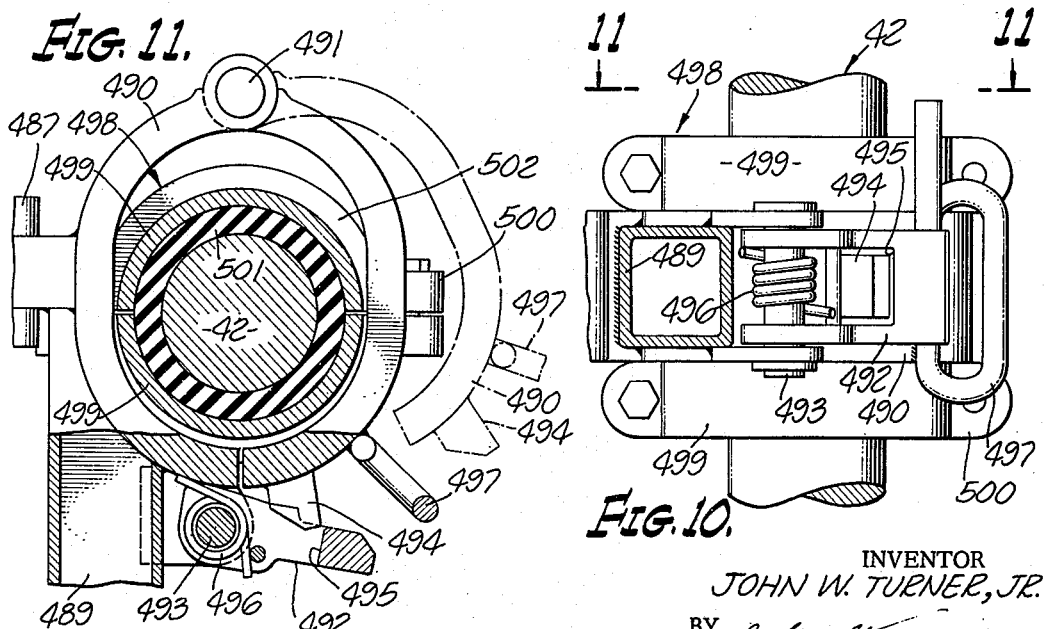
FIG. 10 is a view in vertical section, as taken on the line 10—10 of FIG. 9.
FIG. 11 is a view in horizontal section, as taken on the line 11—11 of FIG. 10.

The shackle assembly 477 includes a transverse brace 489 interconnecting a pair of ring members 490, each of which is hinged at 491 so as to be openable and each of which is provided with latch means for normally holding the same closed. This latch means, as best seen in FIGS. 10 and 11, comprises a latch arm 492 pivoted about a pin 493 carried by one part of the ring member 490 and a latch projection 494 carried by the other part of the ring member 490, the latch arm 492 having an opening providing a shoulder 495 engageable with the lug 494 when the arm is in the normal position to which it is biased by a torsion spring 496 disposed about the pin 493 and acting to normally rotate the arm in a latching direction, as shown in FIG. 8. In addition, the part of the ring member 490 having the lug 494 may also be provided with a closing handle 497.

Each of the ring-like members 490 is transversely elongated so as to allow slight lateral movement of the links 42, and each of the links is preferably provided with a bushing adapted to be disposed within the respective ring members 490, such bushings being generally denoted at 498 and illustratively comprising a pair of bushing half sections 499 having interconnected ears 500, whereby the half sections are adapted to be clamped about a rubber sleeve 501 disposed about the respective links 42 and providing an annular channel 502 in which the ring parts 490 engage when the ring parts are latched in the closed positions.

From the foregoing it will be apparent that the link stabilizer means 47 will function as thusfar described to provide a rigid support engaging the respective links 42 between the ends of the links to prevent the links from swinging on the hook ears 43, except within the limited confines of the transversely elongated ring members 490, such limited transverse swinging of the links being necessary to allow opening and closing of the elevator 44. Thus, the links are stabilized against rolling movements of the vessel 21 so that, when the actuator motor 108 of the block and hook structure positioning and guiding apparatus 46 is extended to move the open elevator towards the tool joint 49a, it is assured that the open elevator will be moved into engagement with the pipe, notwithstanding any tendency of the links to swing away from the pipe due to roll of the vessel. Likewise, inasmuch as the automated handling of pipe would require that the pipe be positively forced into the open elevator to assure non-failing closure of the latter, the link stabilizer means also is advantageous in the automatic handling of pipe where an attendant is not on hand to observe whether the elevator has, in fact, been engaged by the pipe so as to cause closure of the elevator.

While the stabilizer means is employed during the so-called round tripping of the drill pipe, or in the running of other pipe, such as casing, it is necessary that during the periods of drilling activity the links 42 and the elevator 44 be swung to an out of the way position, as illustrated in FIG. 18, at which time a drilling swivel 503 is supported by a bail 504 in the hook 38b.

Accordingly, releasable latch means are provided which, as illustrated in FIGS. 13 through 17, are adapted to releasably hold the stabilizer frame structure in fixed relation to the hook 38b. This releasable latch means includes a support member 505 extended transversely between the side members 471 of the stabilizer frame. Carried by the support member 505 is a support bracket 506, to which is pivotally mounted by a pin 507 a latch arm 508 having a latch lug 509 at its outer extremity. A torsion spring 510 disposed about the pivot pin 507 normally forces the latch arm 508 in a latching direction so that, as seen in FIG. 13 for example, the lug 509 will engage with a transversely extended keeper plate 511 welded to, or otherwise made a pair of, the hook 38b within a channel 512 normally found in such hooks. An additional plate 513 is also provided in the channel 512 providing an abutment or guide to direct the latch lug 509 into the latching position. Latch arm 508 is provided with an eye 514, whereby the latch may be released, and, when released, secondary latch means are provided for releasably holding the latch arm 508 in a released condition.

This secondary latch means includes a latch arm 515 pivoted about a pin 516 carried beneath the latch arm 508, a torsion spring 517 providing the means normally tending to effect latch movement of the secondary latch arm 515. A keeper plate 518 extends transversely with the support member 505 and is adapted to be engaged by a latch lug 519 on the secondary latch arm 515 when the primary latch arm 508 is pulled downwardly to the position shown in FIG. 17. The secondary latch lug 519 has an elongated cam surface 520 slidably engaged beneath the keeper plate 518 to facilitate engagement of the secondary latch lug 519 with the plate 518. The secondary latch arm 515 is provided with an eye 521 whereby the latch arm 515 may be pivoted downwardly from engagement with the keeper plate 518.

Figure 17:
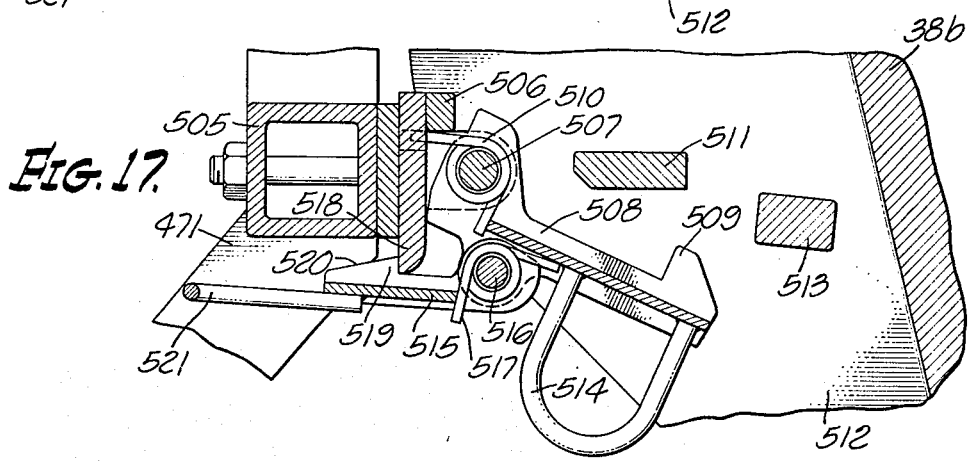
FIG. 17 is a view generally corresponding to FIG. 16, but showing the releasable latch released.

When the primary latch means is released, as seen in FIG. 17, and latched in the released position, as also shown in FIG. 17, by the secondary latch means, the links 42 are free to swing about the hook ears 43, as shown in FIG. 18, upon engagement of the links with the swivel 503, bumper means 503a being provided between the links and the swivel to hold the links in the displaced positions at which the swivel 503 may be supported by the drilling hook during the normal drilling operations. Thereafter, the swivel 503 and the kelly 63 may be elevated and disconnected from the drill string so as to be stored in the rat hole 64 while the next stand of drill pipe is made up in the drill string.

From the foregoing, the mode of operation of the present invention will be fully apparent and needs no further description, and, while the specific details of an illustrative embodiment of the invention have been shown and described, changes and alterations may be made without departing from the spirit of the invention.

I claim:
1. In a derrick assembly having a traveling block suspended for vertical movement in the derrick, a hook suspended from sad traveling block for vertical movement therewith, elevator links suspended from said hook for vertical movement therewith, a pipe engaging elevator suspended from said links for vertical movement therewith, and means for guiding said traveling block including a vertical track in said derrick, means carried by said traveling block and said track and vertically movable on said track during vertical movements of said traveling block, said hook, said links and said elevator, for restraining said traveling block against other movements relative to said track, the improvement including means for restraining said hook from other movements relative to said track, and link stabilizer means for connecting said hook to said links to restrain said links from other movements relative to said hook as said traveling block, said hook, said links and said elevator move vertically relative to said track.

2. A derrick as defined in claim 1, wherein said means for restraining said hook from other movements relative to said track includes guide means interconnecting said hook with said track.

3. A derrick assembly as defined in claim 1, wherein said means carried by said traveling block and said track includes a carriage shiftable along said track, rigid link means connected with said carriage and said traveling block, and means for actuating said link means to move said traveling block, said hook, said links and said elevator between a position laterally offset with respect to the center of said derrick and a position at the center of said derrick.

4. A derrick assembly as defined in claim 1, wherein said link stabilizer means includes a member pivotally connected to said hook and interconnected with said links, and means releasably latching said member to said hook.

5. A derrick assembly as defined in claim 1, wherein said link stabilizer means includes a member pivotally corrected to said hook and interconnected with said links, means releasably latching said member to said hook, and means releasably latching said member to said links.

6. A derrick assembly as defined in claim 1, wherein said means carried by said traveling block and said track includes a carriage shiftable along said track, rigid link means connected with said carriage and said traveling block, means for actuating said links means to move said traveling block, said hook, said links and said elevator between a position laterally offset with respect to the center of said derrick and a position at the center of said derrick, and including additional rigid link means interconnecting said hook and said carriage.

7. For use in a pipe supporting assembly for use in a well drilling derrick, said assembly comprising: a traveling block adapted to be supported by the drilling line of the derrick a hook, bail means connecting said hook beneath said traveling block, elevator links, means swingably supporting said elevator links beneath said hook, means for interconnecting said traveling block and said hook for restraining the same against articulation, and stabilizer means interconnected with said hook and said links for restraining the same against articulation.

8. An assembly as defined in claim 7, wherein said stabilizer means comprises a member pivotally connected to said hook, means releasably latching said member against pivotal movement and means connecting said member to said links.

9. An assembly as defined in claim 7, wherein said means for interconnecting said traveling block and said hook includes a support member and link means pivotally connecting said traveling block and said hook to said support member.

10. An assembly as defined in claim 9, including operator means interposed between said traveling block and said support member for moving said traveling block and said hook relative to said support member.

References Cited
UNITED STATES PATENTS

| | | | |
|---|---|---|---|
| 2,613,102 | 10/1952 | Roberson | 294—82 |
| 3,278,163 | 10/1966 | Marks | 294—192 |
| 3,281,122 | 10/1966 | Jenkins | 254—190 |
| 3,376,938 | 4/1968 | Scott | 254—139.1 |

HARVEY C. HORNSBY, Primary Examiner

U.S. Cl. X.R.

214—2.5; 294—82, 90